June 18, 1957 E. F. WARD 2,796,503
ECCENTRIC LOAD COMPENSATING STRAIN GAUGE MOUNT
Filed Sept. 23, 1955
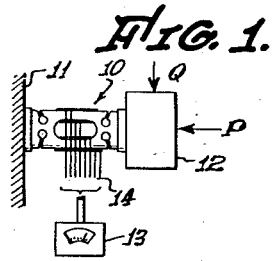
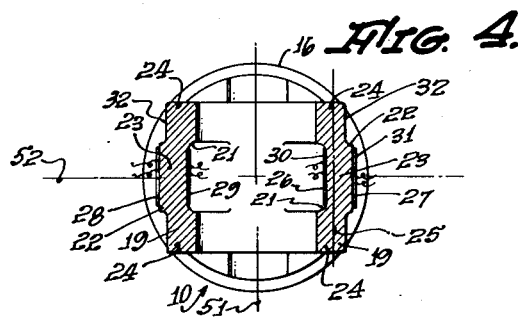
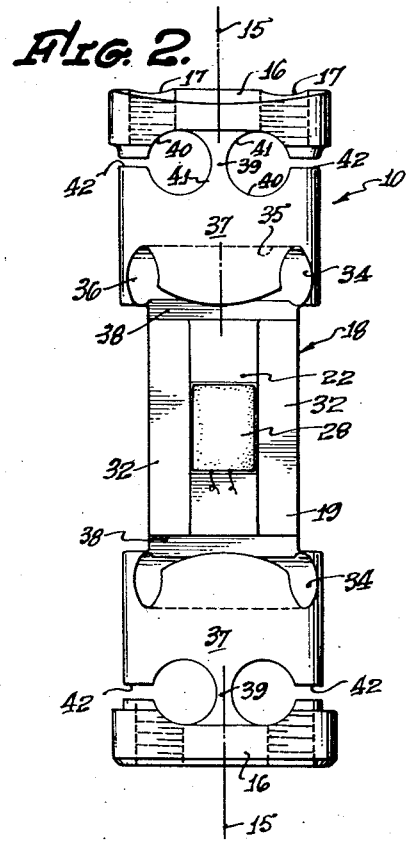
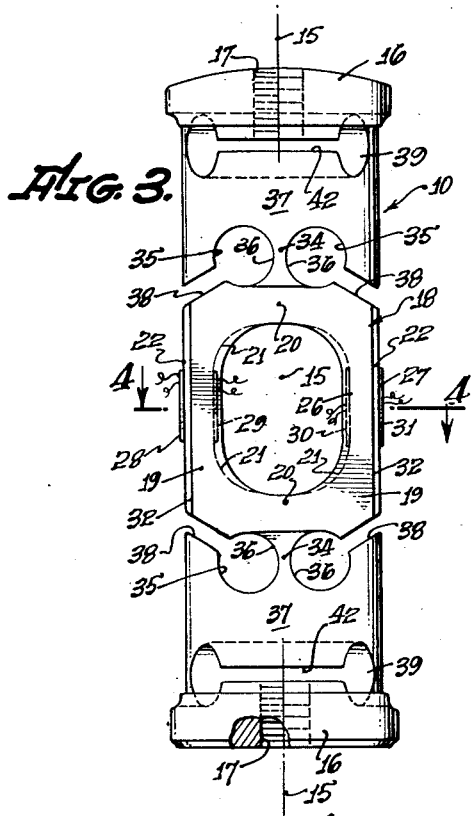
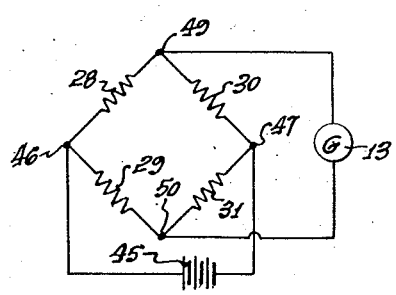
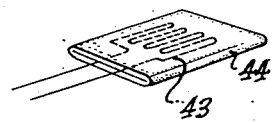
ELMER F. WARD,
INVENTOR.
BY
ATTORNEY.

United States Patent Office 2,796,503
Patented June 18, 1957

2,796,503

ECCENTRIC LOAD COMPENSATING STRAIN GAUGE MOUNT

Elmer F. Ward, Pasadena, Calif., assignor to Task Corporation, Pasadena, Calif., a corporation of California Application September 23, 1955, Serial No. 536,132

17 Claims. (Cl. 201—63)

This invention has to do generally with improvements in strain gauge supports of the type adapted to be subjected to systems of force producing strain or deformation communicated to the strain gauges. More particularly, the invention concerns the provision of a novel support of the above type designed for accurate electrical measurement of force exerted endwise on the support, without the introduction of error into such measurement caused by strains at the gauge supporting surfaces due to forces other than the force to be measured. Equally important, the invention is directed to the purpose of extending the tensile or compressive range of loading applicable to the support in order to increase its utility.

Electric strain gauge supports are used in connection with the load testing of models or prototypes in order to obtain knowledge as to the magnitudes and directions of forces and moments of force applied to the models or prototypes, as by wind loading, vibration and the like. The fundamental principle upon which the use of the strain gauge support is founded may be simply stated as consisting in the production of a change in electrical resistance of a supported strain gauge in accordance with deformation or strain of the surface to which the gauge is fastened, the strain having been produced by loading the support. In general, changes in the electrical properties of a strain gauge are proportional to changes in loading exerted on the gauge support and may be readily measured as voltage or current changes in a circuit of which the gauge forms a part.

For the purpose of obtaining electrical measurements of tensile or compressive loading exerted along or parallel to a reference axis, a particular type of strain gauge support known as an eccentric beam column has been used, in which a pair of strain gauges are fastened to a pair of support surfaces formed on the column and which are subjected respectively to tension and compression, due to the eccentricity of the column relative to the reference axis of the support. While the amount of loading on the column may then be electrically determined by means of the gauges, it is found that the exertion on the strain gauge support of forces and moments of force other than the force whose measurement is sought results in the introduction of error into the determination of the desired force, as a result of additional deformation of the gauge support surfaces communicated to the gauges themselves. With such error introduced into the electrical measurements, it is apparent that accuracy of measurement of the desired force becomes increasingly difficult.

In addition to the foregoing, it is found that the utility of such eccentric beam column-type strain gauge supports is limited insofar as the amount of tensile or compressive loading applicable thereto is concerned, due to the following circumstances. Assuming for purposes of illustration that the eccentric beam column support is subjected to compressive loading along the reference axis, such loading is productive of compressive stress at the gauge supporting surface facing toward the axis and tensile stress at the gauge supporting surface facing away from the axis. However, these stresses are not in general equal in magnitude for reasons as will appear in the description, the compressive stress usually being considerably larger than the tensile stress, assuming the use of a conventional eccentric beam column. As a result, the load limit beyond which the support is not useable is determined by the larger of the two stresses at the gauge supporting surfaces, and when that larger stress produces a strain of such magnitude as to adversely affect the gauge accuracy, no further loading can be exerted on the support. This means that in those instances where small strain gauge supports of known type are being used in model testing, such testing is undesirably limited to a range of loads oftentimes smaller than the load range for which data is sought.

Having in mind the foregoing limitations respecting conventional strain gauge supports, the primary objects of the present invention are, first, to eliminate insofar as is possible the introduction of error into the ultimate determination of the force under consideration by providing a novel multiple strain gauge support characterized by a loop-shaped combination of eccentric beam columns having straight side surfaces for supporting strain gauges positioned symmetrically with respect to one another. Secondly, it is a major object to provide beam columns shaped to have a novel sectional configuration associated with the strain gauge supporting surfaces for the purpose of effecting a stress balance at those surfaces under column loading, so as to substantially extend the load range within which the support is useable.

In carrying out the invention, the body of the strain gauge support is shaped intermediate its ends substantially in the form of a closed loop, the latter comprising essentially a pair of eccentric beam columns having flat sides for supporting strain gauges and opposite ends integrally joined together. The integral loop is joined to the opposite ends of the body by two body portions containing lateral recesses extending from opposite sides thereof toward relatively thin webs comprising flexure pivots. A normal pair of such pivots are provided at each end of the body in longitudinally spaced axial planes for transmitting endwise application of force, while being adapted to flex under body loading other than endwise, for purposes as will appear.

As referred to above, the eccentric beam columns are each provided with a novel sectional configuration in which the strain gauge supporting surfaces on each column are spaced unequal distances on opposite sides of the transverse neutral bending axis of the column section. Furthermore, the strain gauge supporting surfaces at the inner sides of the columns are positioned closer to the transverse bending axes thereof than the strain gauge supporting surfaces at the outer sides of the columns, the spacing being such that the resulting stresses at those surfaces are substantially equal or balanced. Under such conditions of stress balance, the strain gauge support achieves maximum utility and efficiency insofar as the load range applicable to the support is concerned, as will appear.

Other features and objects of the invention, as well as the details of an illustrative embodiment, will be more fully understood from the following description of the drawings, in which:

Fig. 1 is a view illustrating, generally, the use of the strain gauge support;

Fig. 2 is an enlarged elevation showing the exterior of the support;

Fig. 3 is a view of the support exterior taken at right angles to Fig. 2;

Fig. 4 is a section taken on line 4—4 of Fig. 3;

Fig. 5 is a diagrammatic representation of a bridge circuit; and

Fig. 6 is an enlarged perspective view of a typical electrical strain gauge to be fastened to the support.

Referring first to Fig. 1 a simplified showing of the use of a strain gauge support includes the support 10 itself having one of its ends secured to a reference member 11 and its opposite end joined to a model 12 undergoing loading as indicated by the arrow labeled "P." The direction of this loading is illustrated as being generally toward the strain gauge support 10, and it will be understood that compression loading of this type and oppositely directed tension loading are to be measured by the instrument 13 electrically connected by leads 14 to strain gauges fastened to the support. Furthermore, and as will be more fully brought out, the support 10 will generally be subjected in use to forces, including forces producing moments, other than the compressive and tension loads whose measurements are sought, a typical force being illustrated by the arrow labeled "Q" directed toward the model 12. Such other loads and force moments will be transmitted to the strain gauge support 10, but will not be registered by the instrument 13 for the reasons as will appear.

As shown in Figs. 3 through 5, the support 10 comprises an elongated body having a major axis indicated at 15 extending through opposite support ends 16, the latter containing appropriately threaded openings 17 into which threaded connections may be fastened for joining one end of the support to the reference member 11 and the opposite end to the model or object 12 being subjected to loading. The support body includes intermediate its opposite ends 16 an integral loop 18 which is elongated in the direction of axis 15 and comprises essentially an oppositely positioned pair of eccentric beam columns 19 having integrally joined-together opposite ends 20. The eccentric portions of the beam columns 19 extend substantially in the direction of axis 15 and are laterally spaced in offset relation to that axis so as to divide between them the tension or compressive endwise loading exerted on the support.

Referring to Figs. 3 and 4, each of the columns 19 is shown to contain a recess 21 formed at its inner side facing the axis 15, and each column also includes a boss 22 protruding from its outer side facing away from the axis. Formed between the recess and boss and intermediate lateral portions 24 of the column is an offset central portion 23, the column section having a neutral transverse bending axis 25 substantially as indicated by the broken line in Fig. 4.

The inner and outer sides 26 and 27 respectively of each offset portion 23 are formed to extend parallel to one another in the direction of body axis 15, inner surfaces 26 and outer surfaces 27 on the two beam columns being located symmetrically relative to that axis. Furthermore, each inner surface 26 is located closer to the neutral transverse bending axis 25 than the opposite or outer surface 27 formed on each column, their relative spacing being such that when the support is, for example, subjected to compressive loading as indicated by the arrow "P," the stress produced at the outer surface 27 will be substantially equal to the stress produced at the inner surface 26. This spacing may be easily determined by experiment or may be readily calculated by standard stress determination methods from the condition that the bending stress at surface 26 when added to the axial stress in section 23 substantially equals the bending stress at surface 27 less the axial stress in section 23. Figs. 3 and 4 also illustrate strain gauges 28 through 31 fastened to surfaces 26 and 27 on the beam columns.

In Fig. 3, the outer sides 32 of the beam columns are shown to be straight and to extend in the direction of axis 15, this particular arrangement of sides 32 being provided to substantially eliminate undesirable deformations attributable to temperature changes of the support 10, which otherwise tend to produce strains at surfaces 26 and 27 introducing error into the electrical determination of tensile or compressive loading exerted on the support.

The ends 20 of the beam columns forming the upper and lower ends of loop 18 are integrally joined to webs 34 extending transversely through the body of the support within an axial plane thereof. Webs 34 are conveniently formed by drilling transverse spaced openings 35 through the body of the support, so that the webs have circularly concave opposite sides 36. To complete the separation of the loop from opposite end portions 37 of the support, lateral slots 38 are cut through the support body from opposite sides thereof to the openings 35 in the manner shown in Figs. 2 and 3, the slots being considerably narrower in dimension than the diameter of the openings to preserve a maximum of material defining end portions 37 of the body. Furthermore, slots 38 are angled inwardly toward openings 35 and away from loop 18 to form the loop-shaped configuration of the latter.

Referring now to Fig. 2, two additional webs 39 are formed in the support normal to webs 34 and in longitudinal planes axially spaced from the planes of webs 34. Laterally spaced pairs of drilled openings 40 likewise define the circularly concave opposite sides 41 of web 39, and radially extending lateral slots 42 separate body portions 37 from the opposite ends 16 of the support. Pairs of webs 34 and 39 preferably have the same physical dimensions and essentially comprise flexure pivots extending in longitudinally spaced axial planes and adapted to flex much more readily than the eccentric columns 19 when support 10 is subjected to force other than endwise. Since the relatively normal webs 34 and 39 have concave opposite sides extending toward and forming portions of ends 16 and body portions 37, the webs are essentially combined therewith so that the overall length of the support 10 is substantially reduced without sacrificing the sectional properties of portions 37 which are required to transfer endwise applied loads through 90° from one web 39 to the other 34.

The strain gauges 28 through 31 bonded to the surfaces 26 and 27 of the beam columns may comprise gauges of the type shown in Fig. 6. A continuous fine wire 43 shown in broken lines is formed as a grid and embedded between two sheets of insulating material 44 from which the two ends of the wire project. When fastened to a surface undergoing mechanical stress, such a gauge undergoes equivalent strain in such manner as to proportionally change the electrical resistance properties of the wire.

Referring now to Fig. 5, the four strain gauges 28 through 31 are conveniently connected into the Wheatstone bridge circuit illustrated, in which each of the gauges forms one leg of the circuit and pairs of symmetrically located gauges are connected as opposite legs of the circuit. For measurement purposes, a source of current comprising a battery 45 is connected between terminals 46 and 47 representing the junctions between gauges 28 and 29 and gauges 30 and 31 respectively, while a voltage sensitive instrument 13 is connected between terminals 49 and 50 representing respectively the junctions between gauges 28 and 30 and gauges 29 and 31.

In operation, a load exerted along or in the direction of axis 15 such as is designated by the arrow "P" in Fig. 1, is transmitted through the branches of loop 18 comprising the eccentric beam columns 19. Assuming that load "P" is compressive, the outer surface 27 of the offset portions 23 will be put under tensile stress, while the inner surfaces 26 of portions 23 will be placed under compressive stress, and furthermore, the stresses and strains at the inner surfaces 26 will be equal to the stresses at the outer surfaces 27 due to the positioning of the surfaces relative to the neutral bending axis 25.

However, surfaces 26 will be under compressive stress while surfaces 27 will be under tensile stress, so that the electrical resistance characteristics of gauges 28 and 31 will be changed to a first value, while resistance properties of symmetric gauges 29 and 30 will be changed to a second value. As a result, the Wheatstone bridge will be electrically unbalanced and a reading will be obtained from the instrument 13 corresponding to the "P" loading on the strain gauge support. In similar manner, a tension load on the support directed oppositely to arrow "P" will also be recorded on the instrument 13 and can be read directly therefrom after proper calibration.

Assuming, however, that a load such as that designated by arrow "Q" is exerted on the model 12 so as to produce a clockwise moment of force on the support in Fig. 3, and about the transverse axis 51 shown in Fig. 4, it will be seen that surfaces 26 and 27 having gauges 30 and 31 fastened thereto will be put into tension. As a result, the bridge will remain electrically balanced, and no reading will be obtained from instrument 13. Similarly, counterclockwise moments of force exerted on the strain gauge support as shown in Fig. 3 will not unbalance the bridge. In addition, clockwise moments of force exerted on the strain gauge support as shown in Fig. 2, and about the transverse axis 52 illustrated in Fig. 4, will place one-half of each support surface 26 and 27 on one side of the axis 52 under compressive loading and the other one-half of these surfaces on the other side of axis 52 under tension loading, with the result that the bridge circuit will remain electrically balanced. Finally, forces exerted on the model 12 productive of twist about axis 51 of the strain gauge support will produce substantially the same deformation or strain at all of the support surfaces 26 and 27, so that the strain gauges will have their electrical resistance properties changed substantially equally to maintain the bridge in electrical balance.

In conclusion, it will be observed that the flexure pivots or webs 34 and 35 accommodate flexing of the support about the transverse axes of the webs much more readily than do the beam columns 19, so that strains produced at the gauge supporting surface are minimized in the first instance. In other words, the strain gauge support adjusts itself to loads exerted in directions other than in axis 15 so that a minimum of distortion or strain is communicated to the gauge supporting surfaces by such loads, whereas endwise loads exerted in the direction of axis 15 are fully transmitted to the beam columns producing strain at the gauge surfaces. In addition, twisting loads exerted about axis 15 are much more readily absorbed between webs 34 and 39 than between sections 23 of the eccentric beam columns, so that distortion of the gauge supporting surfaces due to such twisting loads is minimized in the first instance.

I claim:

1. A multiple strain gauge support, comprising a body having opposite ends for receiving endwise application of force in the direction of the body axis, said body including an integral loop intermediate said ends having branched portions extending substantially in the direction of said axis in laterally spaced offset relation thereto for transmitting said force, said portions having surfaces extending substantially parallel to said axis in symmetrically offset relation thereto for supporting strain gauges, said body including a pair of integral relatively normal reduced cross section parts extending in longitudinally spaced axial planes between each of said ends and said loop and said body containing recesses at opposite sides of said parts and formed laterally inwardly from opposite body sides, said parts being adapted to transmit said force and to flex in response to force applied to said body at an angle to said axis.

2. A multiple strain gauge support, comprising a body having opposite ends for receiving endwise application of force in the direction of the body axis, said body including an integral closed loop intermediate said ends having a pair of branched portions extending substantially in the direction of said axis in laterally spaced offset relation thereto for transmitting said force, said portions having surfaces extending substantially parallel to said axis in symmetrically offset relation thereto for supporting strain gauges, said body including a pair of integral relatively normal webs extending in longitudinally spaced axial planes between each of said ends and said loop and said body containing recesses at opposite sides of said webs and formed laterally inwardly from opposite body sides, said webs being adapted to transmit said force and to flex in response to force applied to said body at an angle to said axis.

3. A multiple strain gauge support, comprising a body having opposite ends for receiving endwise application of force in the direction of the body axis, said body including an integral loop intermediate said ends having branched portions extending substantially in the direction of said axis in laterally spaced offset relation thereto for transmitting said force, said portions having surfaces extending substantially parallel to said axis in symmetrically offset relation thereto for supporting strain gauges, said body including a pair of integral relatively normal reduced cross section parts extending in longitudinally spaced axial planes between each of said ends and said loop and said body containing recesses including concave openings at opposite sides of said parts and formed laterally inwardly from opposite body sides, said parts being adapted to transmit said force and to flex in response to force applied to said body at an angle to said axis.

4. A multiple strain gauge support, comprising an elongated metallic body having opposite ends for receiving endwise application of force in the direction of the body axis, said body including intermediate said ends an integral loop having branches forming a pair of eccentric beam columns extending substantially in the direction of said axis in laterally spaced offset relation thereto for transmitting said force, each of said columns having a pair of substantially parallel surfaces adapted to support strain gauges and formed on opposite column sides to extend in the direction of said axis and in symmetric relation to similar surfaces formed in the other of said columns, said body including a pair of integral relatively normal webs extending in longitudinally spaced axial planes between each of said ends and said loop, and said body containing recesses at opposite sides of said webs formed laterally inwardly from opposite body sides, said webs being adapted to transmit said force to flex in response to force applied to said body at an angle to said axis.

5. The invention as defined in claim 4 in which said pair of surfaces include one surface facing toward said body axis and an opposite surface facing away from said axis.

6. The invention as defined in claim 5 in which said surfaces are spaced on opposite sides of the neutral bending axis of said column and unequal distances therefrom to provide for a condition of substantial stress balance at said surfaces during force transmission by said column.

7. The invention as defined in claim 6 in which said one surface is spaced closer to said bending axis than said opposite surface.

8. The invention as defined in claim 7 in which each of said columns contains a recess on the side thereof facing said body axis and includes a boss on the side thereof facing away from said body axis to form a laterally offset portion opposite sides of which comprise said surfaces.

9. The invention as defined in claim 8 in which said portion is formed intermediate the lateral sides of said column.

10. The invention as defined in claim 4 in which two of said webs extend in an axial plane and are integrally connected with opposite ends of said loop.

11. The invention as defined in claim 4 in which each of said webs has reduced thickness relative to the thickness of each of said columns between said surfaces formed thereon.

12. A multiple strain gauge support, comprising an elongated metallic body having opposite ends for receiving endwise application of force in the direction of the body axis, said body including intermediate said ends an integral loop having branches forming a pair of eccentric beam columns extending substantially in the direction of said axis in laterally spaced offset relation thereto for transmitting said force, each of said columns containing a recess on the side thereof facing said axis and including a boss on the opposite side thereof to form a laterally offset portion having a pair of substantially parallel surfaces on opposite sides thereof, said surfaces extending in the direction of said axis and in symmetric relation to similar surfaces formed on the other of said columns, said body including a pair of integral relatively normal webs extending in longitudinally spaced axial planes between each of said ends and said loop, and said body containing recesses at opposite sides of said webs formed laterally inwardly from opposite body sides, said webs being adapted to transmit said force to flex in response to force applied to said body at an angle to said axis.

13. The combination comprising an elongated metallic body having opposite ends for receiving endwise application of force in the direction of the body axis, said body including an integral loop intermediate said ends having branched portions extending substantially in the direction of said axis in laterally spaced offset relation thereto for transmitting said force, said portions having surfaces extending substantially parallel to said axis in symmetrically offset relation thereto, said body including a pair of integral relatively normal webs extending in longitudinally spaced axial planes between each of said ends and said loop and said body containing recesses at opposite sides of said webs and formed laterally inwardly from opposite body sides, said webs being adapted to transmit said force and to flex in response to force applied to said body at an angle to said axis, and a plurality of electrical strain gauges fastened respectively to said surfaces for deformation therewith in response to transmission of force by said branched portions, said gauges being connectible into an electrical circuit the output of which changes in accordance with deformation of said surfaces.

14. The combination comprising an elongated metallic body having opposite ends for receiving endwise application of force in the direction of the body axis, said body including intermediate said ends an integral loop having branches forming a pair of eccentric beam columns extending substantially in the direction of said axis in laterally spaced offset relation thereto for transmitting said force, each of said columns containing a recess on the side thereof facing said axis and including a boss on the opposite side thereof to form a laterally offset portion having a pair of substantially parallel surfaces on opposite sides thereof, said surfaces extending in the direction of said axis and in symmetric relation to similar surfaces formed on the other of said columns, said body including a pair of integral relatively normal webs extending in longitudinally spaced axial planes between each of said ends and said loop and said body containing recesses at opposite sides of said webs and formed laterally inwardly from opposite body sides, said webs being adapted to transmit said force at an angle to said axis, and a plurality of electrical strain gauges fastened respectively to said surfaces for deformation therewith in response to transmission of force by said branched portions, said gauges being connectible into an electrical circuit the output of which changes in accordance with deformation of said surfaces.

15. A multiple strain gauge support, comprising a body having opposite ends for receiving endwise application of force in the direction of the body axis, said body including a pair of body portions extending in the direction of said axis and in laterally spaced offset relation thereto intermediate said ends for transmitting said force, each of said portions having a pair of substantially parallel surfaces adapted to support strain gauges and spaced on opposite sides of the neutral bending axis of said portion and at unequal distances therefrom such that force transmission through said portion produces substantially equal stresses at said surfaces, and said body including means through which said force is transmissible between said ends and body portions and adapted to flex in response to force applied to said body at an angle to said axis.

16. The invention as defined in claim 15 comprising an integral loop forming said body portions.

17. The invention as defined in claim 15 comprising a pair of integral relatively normal webs extending in longitudinally spaced axial planes between each of said ends and said body portions.

References Cited in the file of this patent

UNITED STATES PATENTS

| | | |
|---|---|---|
| 2,561,318 | Ruge | July 17, 1951 |
| 2,611,266 | Wiancko | Sept. 23, 1952 |